United States Patent
Gustavsson et al.

(10) Patent No.: US 6,769,261 B2
(45) Date of Patent: Aug. 3, 2004

(54) METHOD AND SYSTEM FOR CONTROLLED COOLING OF SMALL MILK QUANTITIES

(75) Inventors: Mats Gustavsson, Uppsala (SE); Anders Björk, Norsborg (SE); Magnus Lidman, Rönninge (SE)

(73) Assignee: DeLaval Holding AB, Tumba (SE)

( * ) Notice: Subject to any disclaimer, the term of this patent is extended or adjusted under 35 U.S.C. 154(b) by 0 days.

(21) Appl. No.: 10/363,911
(22) PCT Filed: Sep. 5, 2001
(86) PCT No.: PCT/SE01/01890
§ 371 (c)(1),
(2), (4) Date: Sep. 29, 2003
(87) PCT Pub. No.: WO02/19805
PCT Pub. Date: Mar. 14, 2002

(65) Prior Publication Data
US 2004/0050092 A1 Mar. 18, 2004

(30) Foreign Application Priority Data
Sep. 8, 2000 (SE) .............................. 0003191

(51) Int. Cl.⁷ .............................................. F25D 23/12
(52) U.S. Cl. .......................... 62/56; 366/136; 366/144; 366/165.1; 62/337
(58) Field of Search ......................... 62/337, 338, 339; 137/592; 366/136, 144, 165.1, 165.4, 167.1, 173.1, 173.2; 165/108, 132

(56) References Cited

U.S. PATENT DOCUMENTS

| | | | | |
|---|---|---|---|---|
| 2,545,100 A | * | 3/1951 | McIntyre | 172/305 |
| 2,578,994 A | * | 12/1951 | Dunaway | 222/133 |
| 4,005,854 A | * | 2/1977 | Patton | 366/165.1 |
| 4,371,034 A | * | 2/1983 | Yamada et al. | 165/108 |
| 4,660,988 A | * | 4/1987 | Hara et al. | 366/137 |
| 5,503,220 A | * | 4/1996 | Wood et al. | 165/108 |
| 5,769,025 A | | 6/1998 | Van Der Lely et al. | |

FOREIGN PATENT DOCUMENTS

| | | |
|---|---|---|
| EP | 0 755 623 | 1/1997 |
| EP | 0 797 915 | 10/1997 |
| SE | 450 806 | 8/1987 |
| WO | 98/15787 | 4/1998 |
| WO | 01/56370 | 8/2001 |

\* cited by examiner

*Primary Examiner*—William E. Tapolcai
(74) *Attorney, Agent, or Firm*—Young & Thompson

(57) ABSTRACT

A system for controlling the cooling of small milk quantities in a cooling tank (4). An agitation pipe (2) extended through a regular milk outlet (26) in a first end wall (6) of the tank is provided, having a nozzle end (32) for introducing incoming/re-circulated milk onto a milk cooling surface (14) at a predetermined position (dp). The position (dp) being situated (1) between a first end wall (6) and a central part of the tank (4) and laterally displaced (b) relative to the perpendicular central axis of the tank. The nozzle end (32) is directed towards a second end wall (8) of the tank (4). Agitation is performed by the agitation pipe (2) upon demand or when the milk quantity is insufficient for a regular agitator element (27) to work properly.

33 Claims, 8 Drawing Sheets

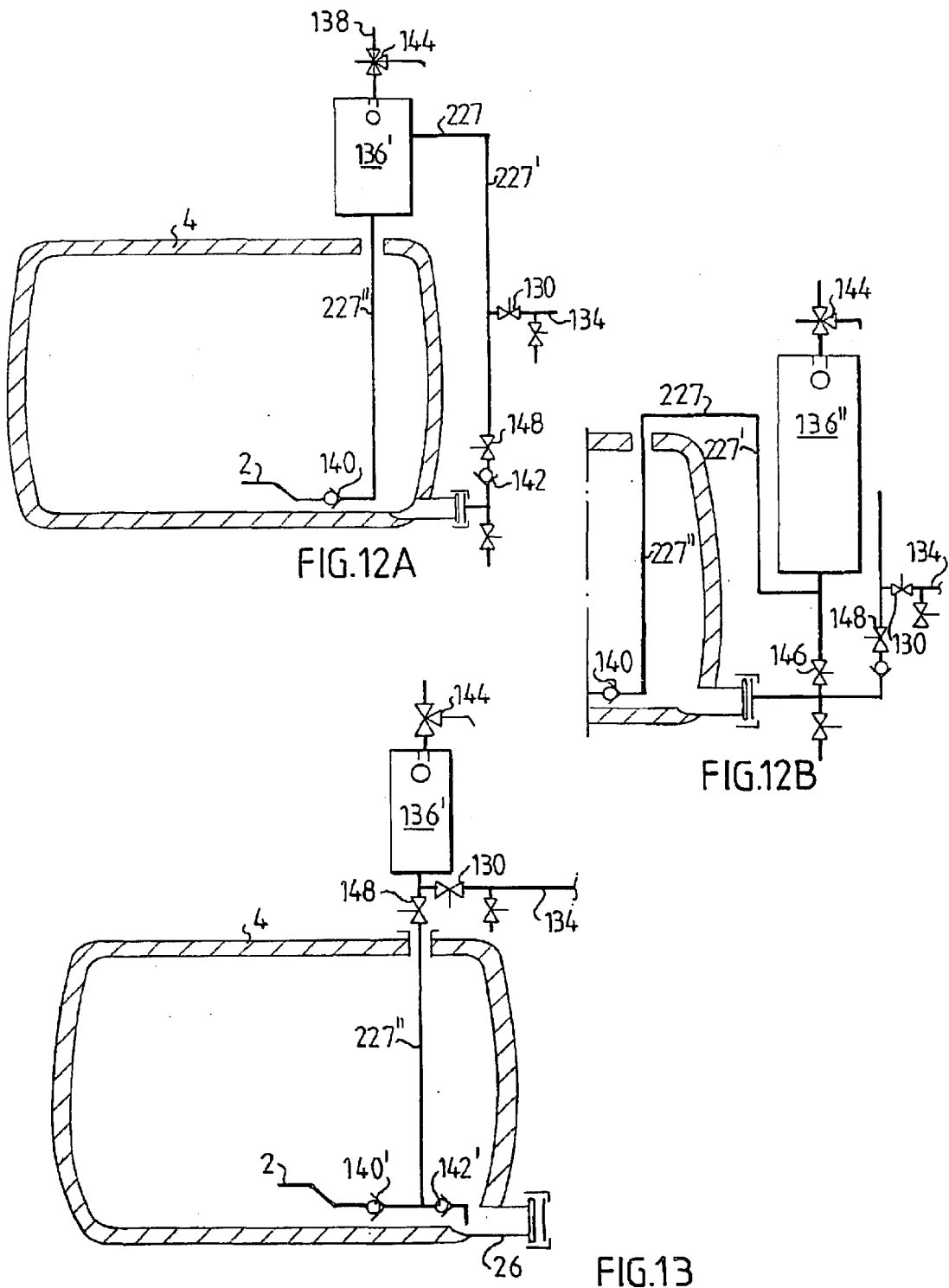

METHOD AND SYSTEM FOR CONTROLLED COOLING OF SMALL MILK QUANTITIES

TECHNICAL FIELD OF THE INVENTION

Figure 1:
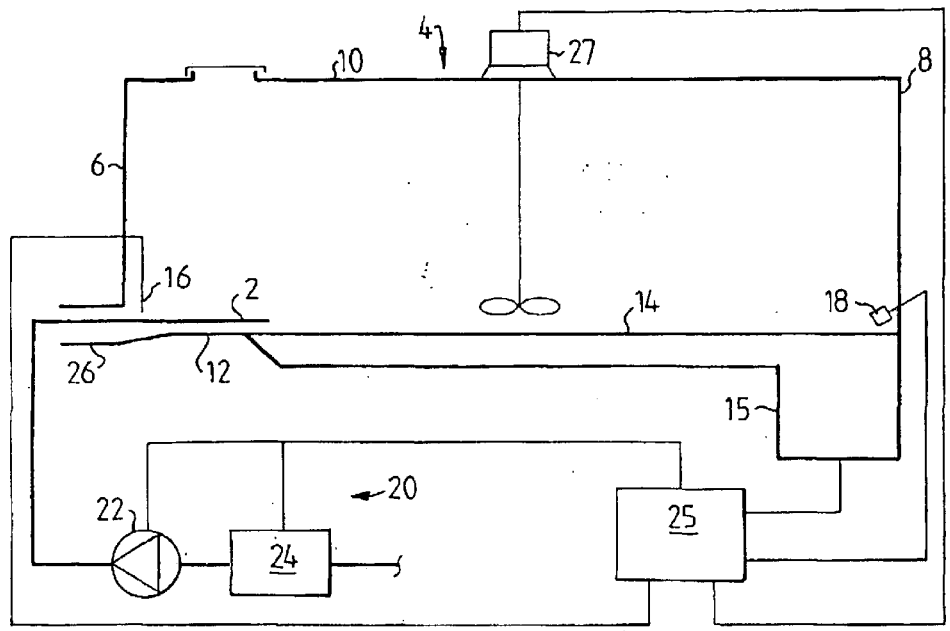

The present invention relates to a method and system for controlling the cooling of small milk quantities (milk spots) entering, with time intervals, a cooling tank having a first end wall, a second end wall and at least a bottom wall portion with a milk contacting cooling surface within the tank being part of a cooling circuit of a cooling equipment.

BACKGROUND OF THE INVENTION

Milk extracted by means of a milking machine is conventionally pumped to a refrigerated cooling tank, e.g. a bulk tank for cooling and storing of the milk. During the storing in the cooling tank a cream separation occurs, which will render the milk inhomogeneous and aggravate sampling of the stored milk when fetched for transportation to e.g. the dairy. The milk samples are being used to establish the quality of the milk and are fundamental for the dairy's payment to the milk producer.

The bulk tank is usually provided with agitator means for agitation of the milk in the tank. On one hand to improve the heat transfer from the milk to a milk contacting cooling surface within the tank, which cooling surface is a part of the cooling circuit of a cooling equipment, and on the other to prevent the formation of a cream-layer in the tank. The cooling tanks on the market are usually designed to be discharged every second day and should therefore be capable to store and cool one quarter (¼) of the total volume within the relatively short period of time when the milking takes place. Principally, since milking conventionally occurs twice a day, said cooling equipment is not to be activated until said agitator means is immersed to a great deal in milk, after a sufficient milk quantity has been assembled in the tank.

A bulk tank of the above kind, being associated with a milking machine used in an automatic milking system (AMS), is therefore subject to an alteration of its fundamental design conditions. E.g. the milk flow will be relatively small and occurs intermittently twenty-four hours a day. Hence, during a period of several hours in connection with the emptying and cleaning of said tank, the milk will be introduced into said tank in milk spots, which form a thin layer only on the bottom of the tank. This will complicate the cooling management and further, when the milk level eventually has reached the agitator means, a cream layer will occur on top, which is highly sensitive to mechanical treatment (shearing). The fat content of the cream consists of emulsified fat particles or fat globes, which are surrounded by a protecting protein coating. If this coating is damaged (by means of mechanical treatment) in such an extent that the fat is freely exposed, an enzymatic breakdown takes place, which in turn generates the formation of free fatty acids, which will have a detrimental effect on the milk quality (bad taste). Further, if freezing occurs it will cause damage to both the casein micelles and fat content as well.

If the cooling equipment is allowed to run at full power and the agitator means is not capable of generating a flow, which is sufficient to ensure a good transmission of heat, there is an impending risk that said thin milk layer would freeze to ice. Then the fat emulsion would also be destroyed and the milk quality deteriorated.

To reduce said risk the power of the cooling equipment could be controlled e.g. as is described in our patent application SE 0000362-4, filed on Feb. 4, 2000. However, the refrigerating capacity would be further increased if the milk spots or thin milk layer were put in motion across the cooling surface in the tank.

It is therefore desirable to create an agitation of the incoming milk in the tank even at a low or non-existent milk level. A suitable equipment would be complementary to the regular agitator means in a present cooling tank associated with an AMS. One of the ideas (the main idea) is that conventional tanks easily can be adapted for AMS so that the farmer need not by a new tank. Thus would the agitators be the same. However, in the time interval immediately after emptying the volume is small and less agitating power and cooling power would be needed.

The cooling tank in question is in the shape of a lying cylinder and the cooling surface is part of its cylindrical envelope surface. Therefore, the milk layer is particularly thin at the outer regions of the cooling surface, which means an increased freezing risk. On the other hand, the refrigerant is introduced into the vaporiser, usually below the lowest part of the envelope surface of the tank at one of its end walls, where the milk layer can be expected to be thicker. However, as a rule the tank is arranged to incline towards its opposite end wall, where the outlet usually is arranged, in order to achieve discharging in an efficient way. Due to this fact, occasionally the milk layer will be particularly thin even over that part of the envelope surface of the tank below which the refrigerant is introduced, also with an increasing freezing risk as a result.

Consequently, for a considerable period of hours in connection with the emptying and cleaning of the tank, there will occur only a thin milk layer on the cooling surface within the tank. Said milk layer will be particularly thin at the outer regions of the cooling surface, which means an increasing freezing risk.

Therefore, it is desirable to achieve relatively long cooling sequences with a minimum of freezing risk even for small milk quantities. This might be achieved by decreasing the magnitude of cooling power and providing to a present magnitude of cooling power correspondingly controlled pumping sequences for the emptying of an end unit of a milking system into the tank.

OBJECT OF THE INVENTION

An object of the invention is to solve the described problems with regard to previously known cooling tanks, by providing an improved method and system for cooling of small milk quantities.

SUMMARY OF THE INVENTION

One important factor of the invention is the period of time, during which the milk pump must be running, in order to transfer the milk extracted from one animal to the milk tank. Another important factor is the position in which the input tube is situated in the tank and its direction and thereby the direction of the input flows.

This has been solved by a method of the initially defined kind, which is characterised by the following steps:

a) providing an input means which is arranged for, after said cooling tank has been emptied and cleaned, inducing an intermittent milk flow of said small milk quantities across said milk contacting surface, b) reactivating the cooling equipment upon occurrence of a milk flow, which by its own motion has a sufficient flow rate to prevent freezing of said small milk quantities for a corresponding magnitude of cooling power, and c) using said input means for, after a sufficient amount of small milk quantities have been introduced to form a pool of milk on the bottom of the tank, agitation of said pool of milk by means of the hydraulic input of the incoming milk.

A corresponding system of the initially defined kind, is characterised in that an input means is provided, which is arranged with an agitation pipe having a nozzle end for introducing the incoming milk onto the milk contacting surface at a position, which is situated between said first end wall and a central part of the tank, said position being laterally displaced relative to the perpendicular central axis of the tank, and that said nozzle end of said input means is directed towards said second end wall of the tank.

Preferably, this is performed by arranging to the present magnitude of cooling power correspondingly controlled pumping sequences for the emptying of an end unit of a milking system into the cooling tank, after milking of each animal, and transporting milk from the under-pressure part or re-circulating milk from the cooling tank.

Suitably, said incoming milk is drawn from said pool of milk by pumping means.

Advantageously, this can be achieved by arranging said input means for inducing a rotatory movement of said pool of milk.

Suitably, this is possible by arranging said input means with at least one agitation pipe for introducing said hydraulic input of the incoming milk laterally displaced in the tank.

Preferably, this can be achieved by inserting an agitation pipe to be extended through a regular milk outlet of the tank.

Advantageously, this is performed by directing a nozzle end of said agitation pipe towards said second end wall of the tank, for introducing the incoming milk in said direction and essentially parallel to the bottom wall portion of the tank.

Suitably, this is possible by arranging a temperature transducer within the tank for monitoring the milk temperature in the tank and controlling said cooling equipment such, that the cooling power is reduced to a minimum when the milk temperature is decreasing and approaching a value in an interval between +6 and +10° C.

Preferably, this can be achieved by deactivating the cooling equipment when the milk temperature is approaching a value in an interval between +3 and +4° C.

Advantageously, this is possible by reactivating the cooling equipment when the milk temperature is increasing and approaching a value in an interval between +6 and +10° C.

Preferably, this is performed by arranging a means for measuring and monitoring the milk quantity in the tank and deactivating said cooling equipment when the milk quantity is insufficient for a regular agitator means to work properly.

Advantageously, the input means comprises a first agitation pipe having a first end and a second end, which agitation pipe at said first end is attached to and extended through a regular milk outlet in said first end wall and said second end being formed with said nozzle end.

Suitably, the position, at which the incoming milk is introduced to the milk contacting surface, is further determined by means of the nozzle end being located at a predetermined height over the lowest part of said bottom wall portion.

Advantageously, a spacer means is arranged to separate the nozzle end from said bottom wall portion.

Preferably, said input means comprises a second agitation pipe, which is correspondingly arranged in the second end wall opposite to said first agitation pipe in the first end wall of the tank.

Suitably, said input means comprises a pump means, which is embodied of the milk pump of the end unit in a milking system.

Advantageously said input means comprises an additional pump means.

Preferably, said additional pump means is comprised of a circulation pump of the centrifugal type.

Suitably, said circulation pump is of the submersible type and located inside the tank.

Advantageously, the circulation pump is arranged to draw milk from the pool at the lowest part of the bottom wall portion.

Preferably, the circulation pump is driven by means of a long drive shaft and a driving motor mounted on top of the tank.

Suitably, the additional pump means comprises a pump of the injector type driven by means of the pressure from the milk pump.

Advantageously, the additional pump means comprises an external circulation pump, the inlet of which being associated with the outlet of the tank.

Preferably, said external circulation pump is provided with a return line, which is passing over the top side of the tank and the uppermost part of which being provided with a vacuum-connected chamber, for returning milk from said outlet to the tank.

Suitably, said return line, downstream of said chamber, is connected to the agitation pipe via a first check valve.

Advantageously, said external circulation pump is omitted and said first check valve being arranged for interacting operation with a second check valve, by means of a three way valve at said vacuum-connection to said chamber.

Preferably, said chamber is located at a level, which is lower than the top of the tank.

Suitably, said return line, downstream of said chamber, is connected to the agitation pipe via a third check valve and is associated with said outlet of the tank by means of a fourth check valve, said check valves being arranged to interact such, that a flow would be allowed in the direction from the fourth to the third check valve only.

Advantageously, a milk transport line, by means of fourth and fifth valve means, is connectable to either said vacuum chamber or an accumulation chamber, which is located at a higher level than said vacuum chamber.

Preferably, first, second and third milk transport lines are connectable to said accumulation chamber, by means of correspondingly arranged fifth valve means.

Further features of advantageous embodiments and developments appear from the following description.

DRAWING SUMMARY

The invention will now be further described and elucidated below, by means of examples of preferred embodiments of a system illustrated on the enclosed schematic drawing. FIGS. 1–14 show representations of a cooling system working according to the method of the present invention.

Figures 6, 7, 8:
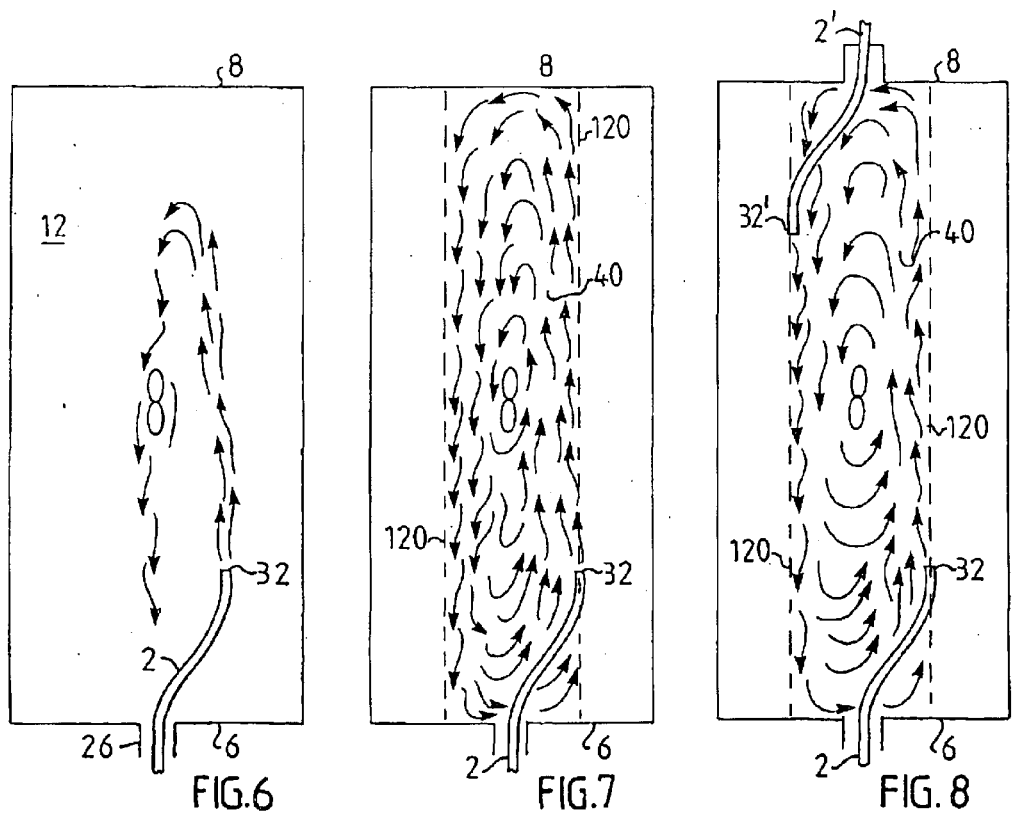
Figure 2:
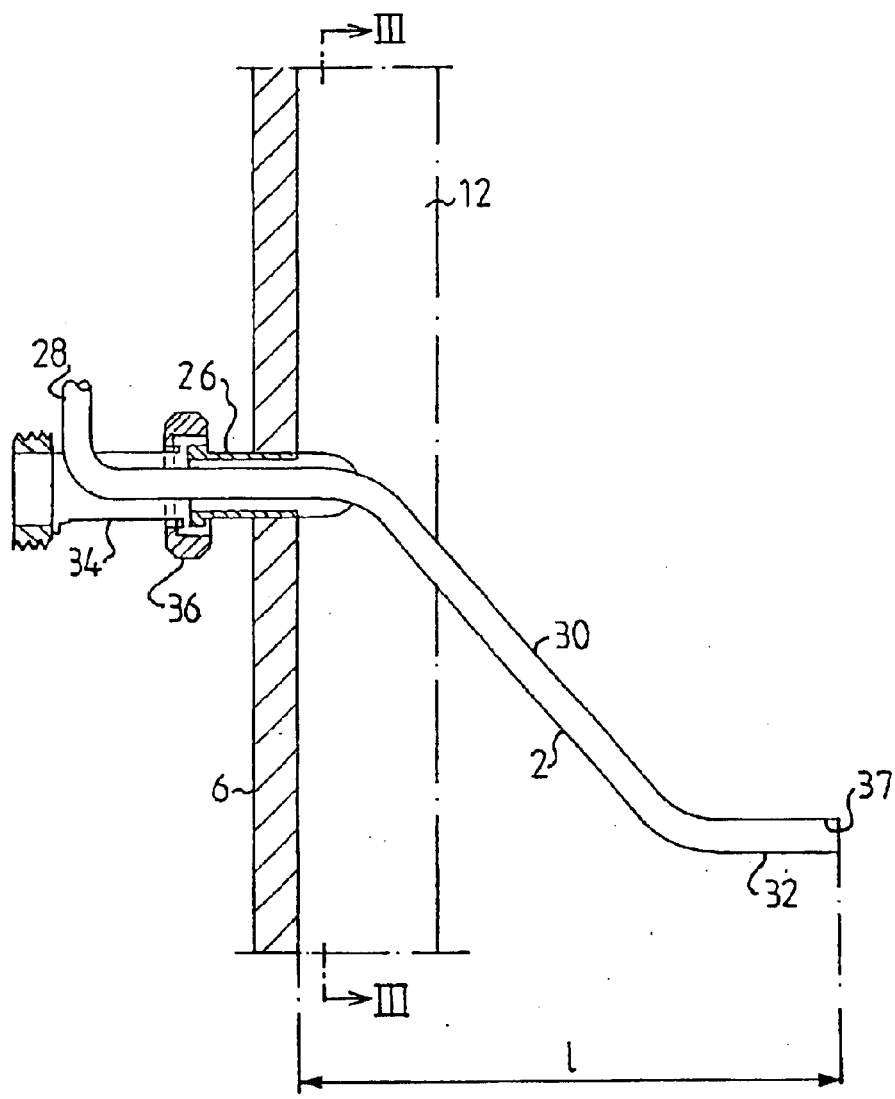
Figure 3:
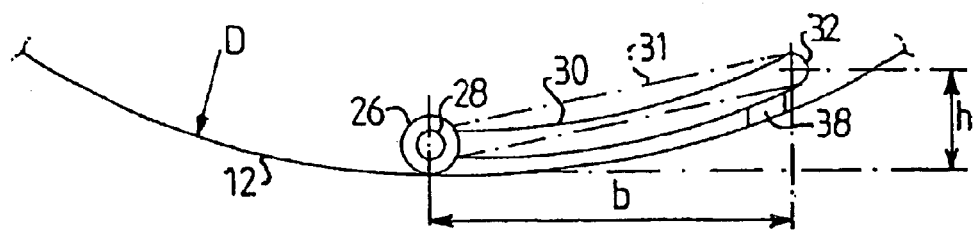
Figure 4:
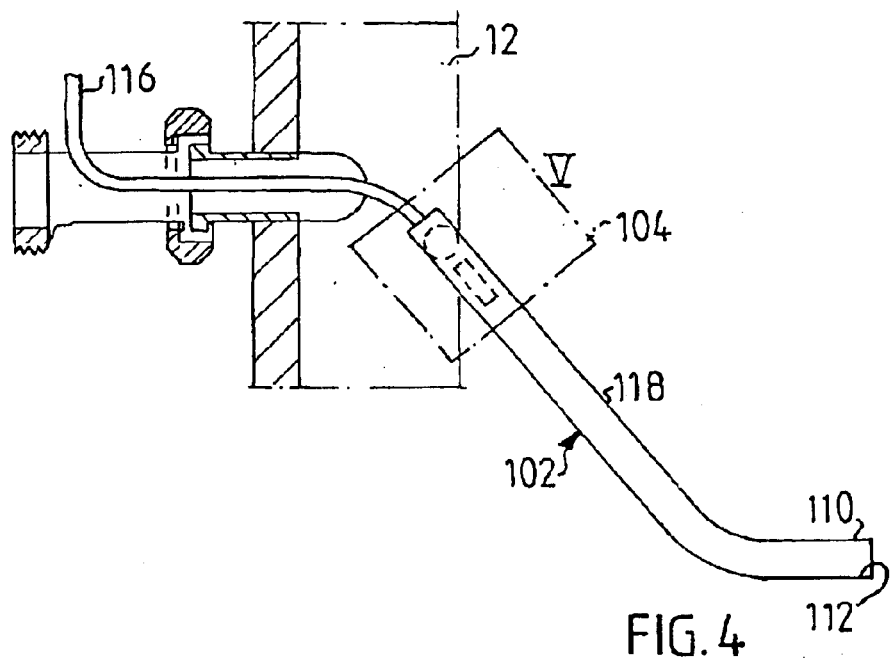
Figure 5:
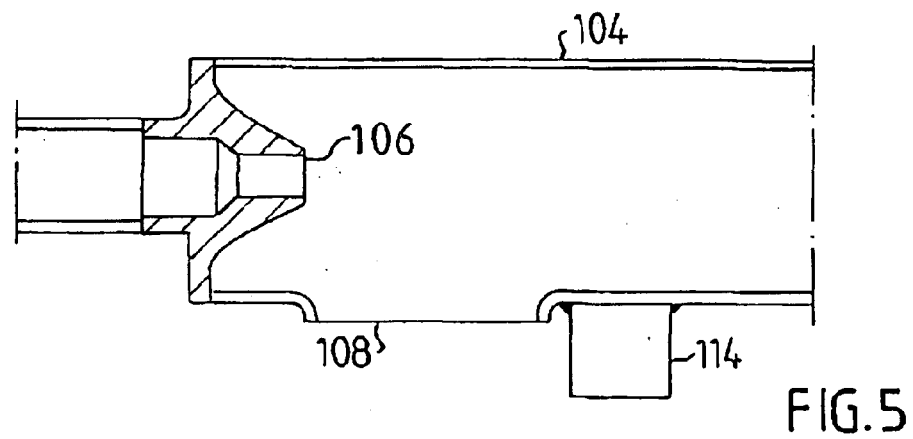
Figure 9A:
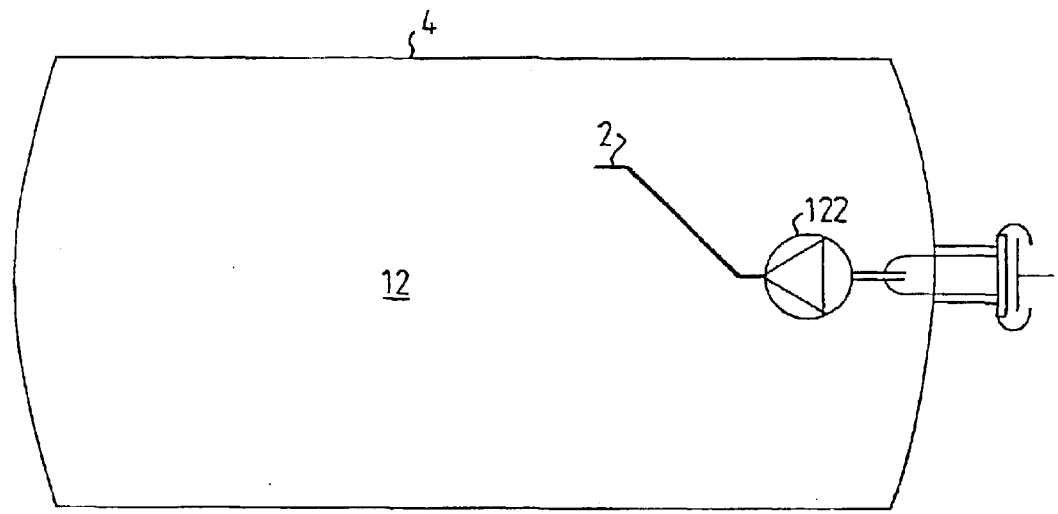
Figure 9B:
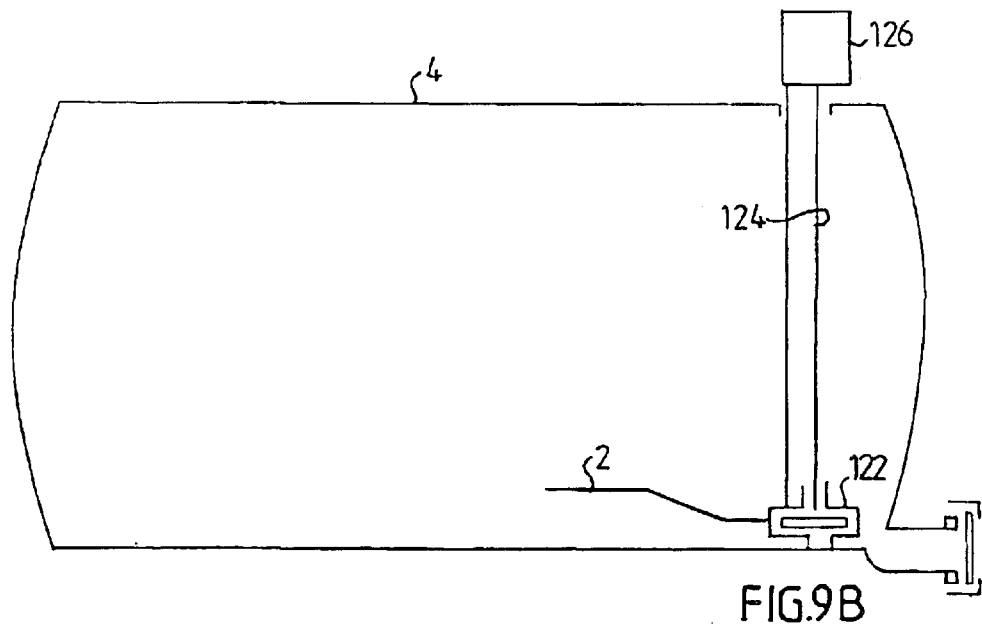
Figure 10:
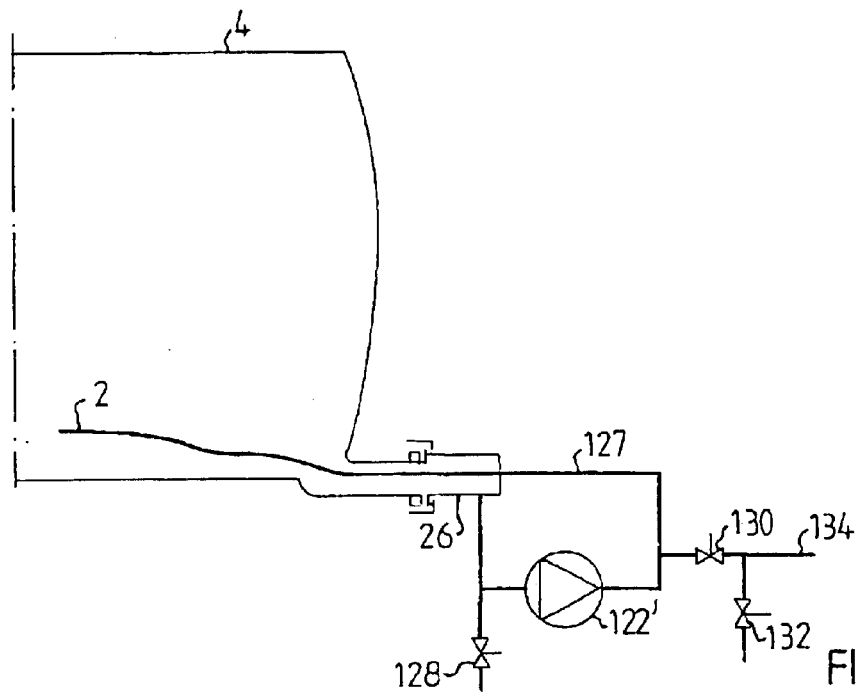
Figure 11:
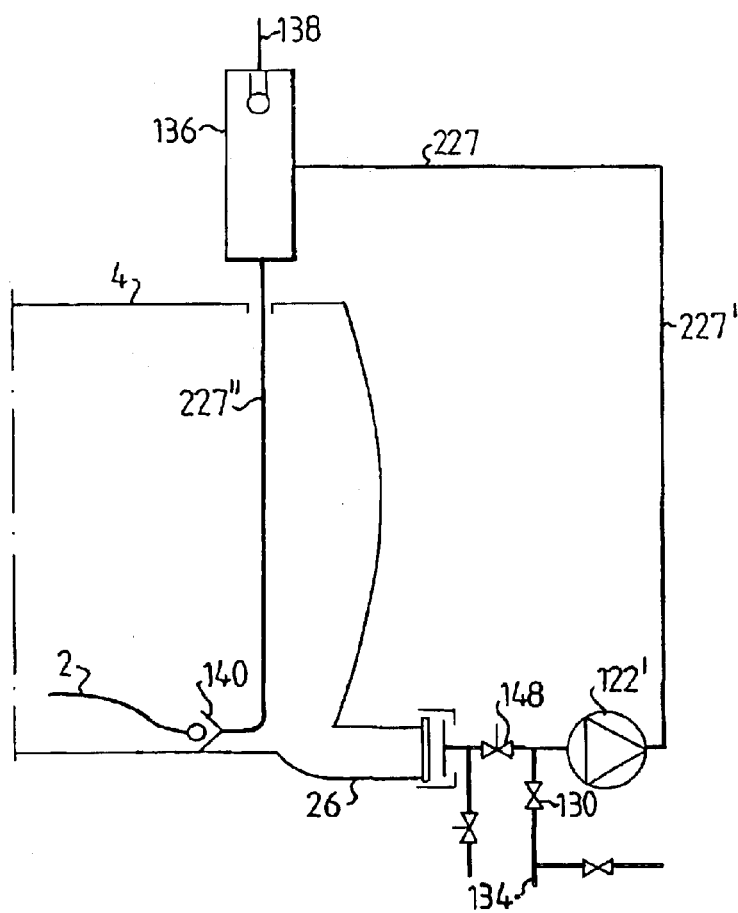
Figure 14A:
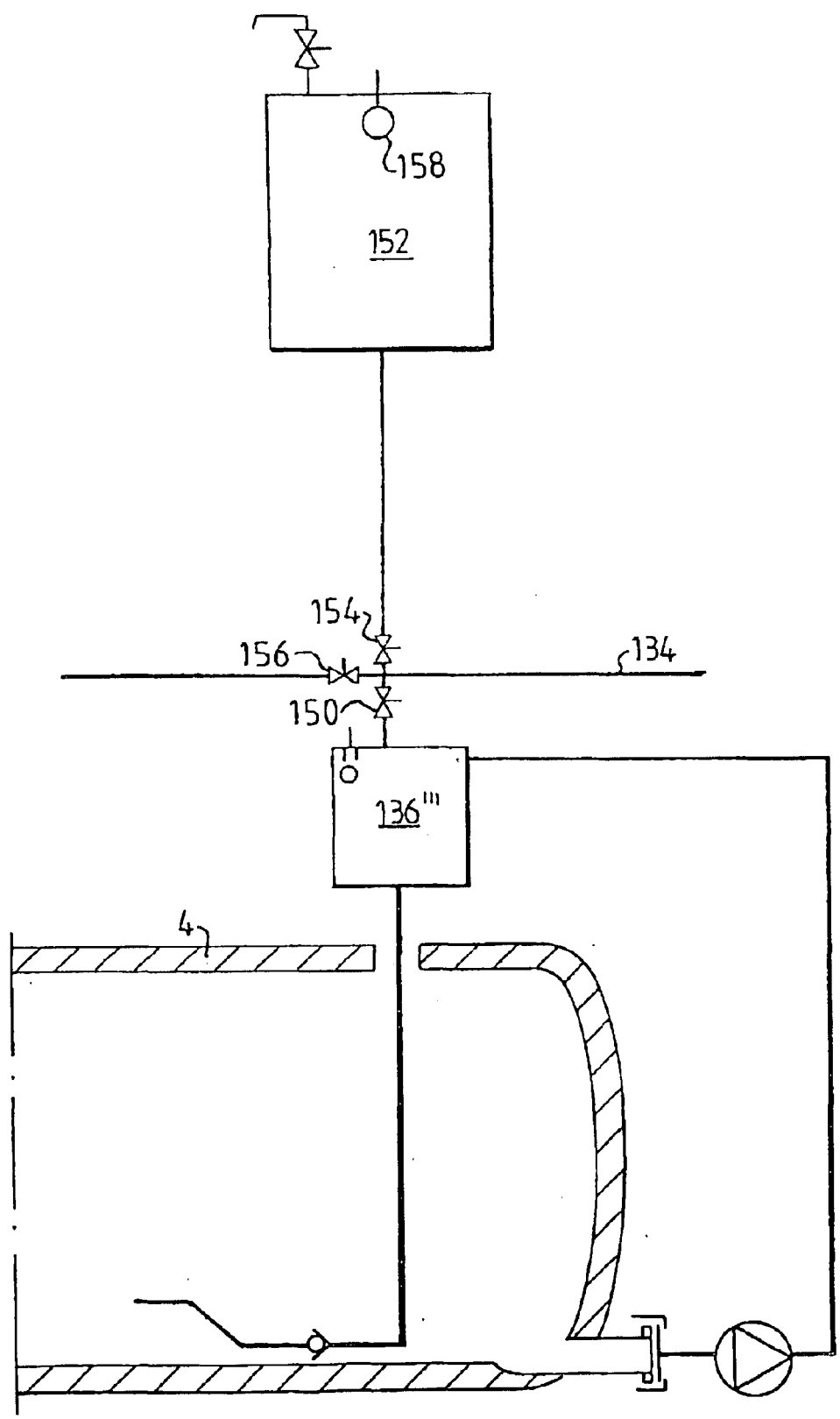
Figure 14B:
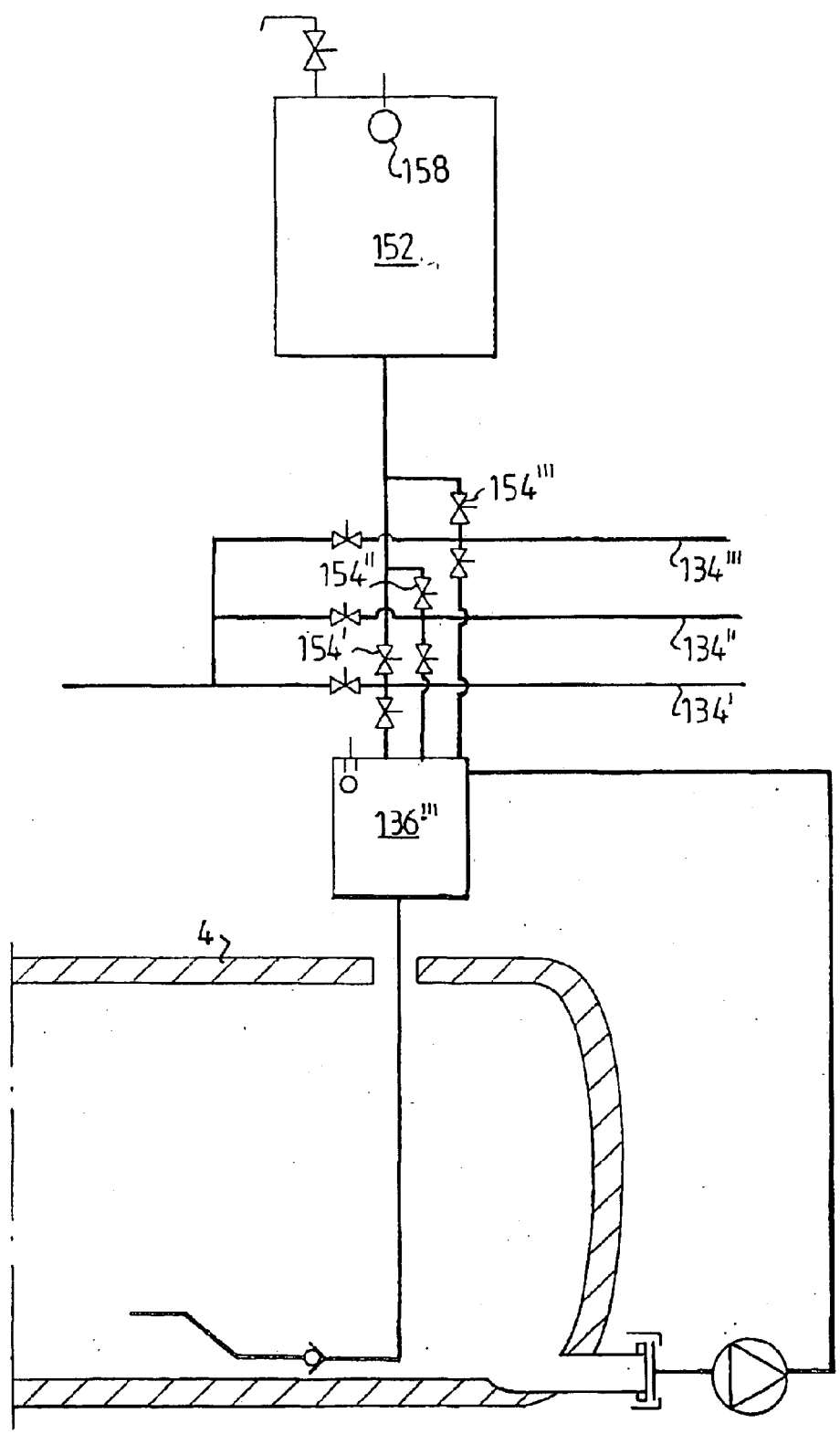

FIG. 1 discloses a diagram of a system according to the invention,

FIG. 2 shows a horizontal view of a part of the cooling tank with the agitation pipe in its intended attitude when mounted in the tank, FIG. 3 shows a partial vertical section view III—III of FIG. 2, FIG. 4 discloses a preferred embodiment of an improved agitation pipe, which is provided with a mixing device of the injector type, FIG. 5 shows a cut out section V—V of FIG. 4 at a larger scale, FIG. 6 shows the flow pattern of an application with one agitation pipe when the first milk spots have entered an empty cooling tank, FIG. 7 shows the same application but after a few animals have been milked, FIG. 8 shows an application according to FIG. 7, but having two oppositely arranged, counter-acting agitation pipes, FIG. 9A shows an embodiment in which the circulation pump is of the submersible type and located inside the tank, FIG. 9B shows a variant of the embodiment in FIG. 9A, FIG. 10 shows a further embodiment having an external circulation pump, FIG. 11 shows an additional embodiment having an external circulation pump and a vacuum chamber, FIG. 12A is a variant of the embodiment in FIG. 11 and shows an arrangement with a pump means in the form of the vacuum chamber only, FIG. 12B is a further development in which it is shown that the vacuum chamber need not be located above the top of the tank, FIG. 13 shows a similar arrangement having one single, combined suction and return pipe, FIG. 14A shows a further embodiment according to FIGS. 11–13 in which an accumulation chamber is co-operating with said vacuum chamber, FIG. 14B. shows a development of the embodiment in FIG. 14A.

DETAILED DESCRIPTION

The figures on the enclosed drawing show some alternative systems or arrangements for controlled cooling of milk spots (=small milk quantities) entering, through a milk inlet tube or stirring/agitation pipe 2, consecutively and with time intervals a cooling tank 4 used as a collecting milk tank downstream of the teat cups (not shown) of a milking machine being part of an automatic milking system (AMS), or preferably a voluntary milking system (VMS®). FIG. 1 is a diagram of a system according to the invention. Said tank 4 may be of a conventional type having a first end wall 6, a second end wall 8 and a longitudinally extended, preferable cylindrical, wall 10. A bottom wall portion 12 of said wall with a milk contacting cooling surface 14 within the tank is part of a cooling circuit of a cooling equipment 15, which may be of a conventional kind or of the kind described in the initially mentioned SE 0000362-4. A milk quantity measuring means 16 and a temperature transducer 18 (for monitoring the milk temperature in the tank 4) are provided within the tank 4. The measuring means 16 may be of any suitable type and may, or may not, comprise a sensor positioned inside the tank or integrated in a wall portion of the tank. The measuring of the milk quantity may be a milk level measurement or a weighing of the tank inclusive its milk content. The temperature measurement may be performed at any convenient position in the tank, such as close to the wall 6 or wall 8 as shown.

An input means 20 comprises said agitation pipe 2 and a pump means 22 connected, on one hand to one end of the agitation pipe 2 and on the other to the outlet from an end unit 24 of said not shown milking system. The other end of said agitation pipe might be associated with the inside of the tank 4. Said pump means 22 might be an internal milk pump arranged inside the tank 4 or integrated with said tank or it might be an external pump arranged outside the tank. The milk quantity may also be measured by summing the flow of milk measured by flow metering devices in the AMS. Advantageously, said pump means may be embodied of the milk pump 22 of the end unit 24 in said milking system.

Suitably, components included in said system or arrangement are controlled by a control unit 25 of a conventional type, which advantageously might be the central control unit of said AMS or VMS®.

The cooling surface 14 of the tank 4 might be included in an essentially cylindrical envelope surface of said bottom wall portion 12 of the tank, having a generatrix which is slightly inclined, generally around 3%, from the horizontal towards a tubular milk outlet 26 in said first end wall 6. Said outlet 26 is arranged at or close above said cooling surface 14 and the centre line of its outer end part is parallel to said generatrix of said envelope surface. Advantageously, said outlet tube 26 is used for leading-in said agitation pipe 2 into the tank 4 and secure it to the first tank wall 6. Alternatively, the complete input means 20 or just the agitation pipe 2 itself might be arranged on the inside of the tank and the line for receiving milk from each end unit 24 introduced at the top of the tank.

Generally, the capacity of the milk pump 22 of the end unit 24 is designed with a pressure head of only a few kPa. Especially when said milk pump 22 is used for pumping the milk through the agitation pipe 2, it is therefore preferable to avoid leading in the incoming milk to the tank 4 via said high up situated line.

The above described cooling system or arrangement is designed for taking the place of a regular agitator means 27 mounted to the tank, when the milk level in the tank is to low for said agitator means to work properly.

According to a first embodiment elucidated by FIGS. 2 and 3, simply a tube having an essentially constant outer and inner diameter all over its length is used to form the agitation pipe 2. The outer diameter might be advantageously adapted so as to achieve a sufficient gap in relation to the inner diameter of the outlet 26, as it is of vital importance that the agitation pipe does not hinder the normal function of the outlet. In this respect it has been found that an agitation pipe having an outer diameter of 10–35 mm and preferably 25 mm meets these requirements for a great number of tanks. The inner diameter must give a sufficiently low flow velocity.

FIG. 2 shows a horizontal view of a part of the tank 4 with the agitation pipe 2 in its intended attitude when mounted in the tank. A first end or a preferably right-angled introductory end 28 is followed by an intermediate section 30; 31, which declines by approximately 45° from a first leg of said introductory end, and a second end or a nozzle end 32, which declines by approximately 45° back to essentially the same direction as said first leg. The second leg of the introductory end 28 is advantageously associated with the milk pump 22 and by means of a joint, e.g. a weld joint, suitably mounted in an extension tube given the form of a double flanged sleeve 34. This makes it possible to secure the agitation pipe 2 to the first end wall 6, said first leg of said introductory end projecting through the outlet tube 26 and said nozzle end 32 being maintained in a desired position (dp) inside the tank 4 by means of said intermediate section 30. For this purpose said sleeve 34 is attached to the regular flanged coupling 36 of the outlet tube and its free end might, in a conventional manner be provided with a not shown cut-off valve. In the above described mounting position, the nozzle end 32 of the agitation pipe 2 is extended towards the second end wall 8 and emerges into an orifice 37 in said desired position (dp) a distance (l) from the first end wall 6. Further, the nozzle end 32 of the agitation pipe 2 is laterally displaced a distance (b) relative to the perpendicular central axis of the tank and is located at a distance (h) over the lowest part of the tank bottom wall portion 12. Hence, by making proper selections as to the values of said three distances (l×b×h), it is possible to have the incoming milk introduced at a desired position ono the milk contacting surface 14.

FIG. 3 shows a partial vertical section view III—III of FIG. 2, which illustrates the transversal dimensions (b) of the agitation pipe 2 and the height (h) of its nozzle end 32 over the lowest part of the tank bottom wall portion 12. In this respect, the nozzle end 32 might advantageously be provided with a spacer means 38, which would bear on the bottom wall portion 12 on the inside of the tank 4. The dimensions of said spacer means 38 are not critical to the functional features of the agitation pipe 2, as the purpose of the spacer means is to lift up the nozzle end 32 a small distance of e.g. 5–40 mm from said bottom wall portion 12. The spacer means 38 might be embodied by a metal piece, preferably a fin 38, attached to the underside of the nozzle end 32 by means of, e.g. a welding seam or the like. By these measures it will be ascertained that the agitation pipe 2 when mounted, by no means will be in contact with the envelope surface of the bottom wall portion 12. In this way the spacer means 38 creates gaps between every part of the agitation pipe 2 and the bottom wall portion 12, which are sufficiently wide to facilitate the cleaning procedure of the tank. That is there will be fewer nooks and corners where residuals of milk, contaminations etc. might be detained. Further, a more distinct fixation of the nozzle end 32 will be achieved.

By these measures, the desired position (dp) of the nozzle end 32 might be determined for the specific dimensions of each possible tank, simply by altering the proportions (l×b×h) of the agitation pipe 2 and adapting the spacer means 38 accordingly, to agree with said proportions.

FIGS. 4 and 5 show a preferred embodiment of an improved agitation pipe 102, which is provided with a mixing device 104 of the injector type, comprising an injector jet 106, through which the incoming milk is fed to the tank. Said mixing device 104 is arranged to prolong the period of time during which the milk flow is exerting an influence on the tank content inclusive of the incoming milk and simultaneously maintaining a desired volume flow through the agitation pipe 102. This makes it possible to achieve a decreased flow rate of the incoming milk while the flow volume, which is driving the stirring movement, is maintained at a desired high level of effect.

The time prolongation is obtainable in that said mixing device 104, by means of an opening 108 with a relatively large diameter in its bottom side envelope surface, is drawing up milk from the present existing volume at the tank bottom, thereby giving the flow through the agitation pipe 102 a suitable speed. The free end of the agitation pipe 102 ends in a nozzle end 110, in which an orifice 112 is arranged, through which the outgoing flow is released into the tank. Said opening 108 is by means of a spacing block 114, which bear on the tank bottom, located preferably 5–15 mm or approximately 10 mm above the same. In similarity to the agitation pipe 2, as earlier described, the agitation pipe 102 may be secured to the first end wall 6. Hence, the agitation pipe 2 may be replaced with the mixing agitation pipe 102 as required. By these measures, even the desired position (dp) of the nozzle end 110 might be determined for the specific dimensions of each possible tank, simply by altering the proportions (l×b×h) of the agitation pipe 102 and adapting the spacing block 114 accordingly, to agree with said proportions.

In this respect, it should be observed that the envelope surface of the bottom wall portion 12 of the tank 4, might not be a cylindrical, but an elliptical or a planed surface as well. It is therefore advantageous to adapt the spacer means 38 and whenever applicable the spacing block 114 to the bottom form of the tank 4 in question, so as to achieve a suitable value for the height (h).

The flow through the agitation pipe 2, 102 may have a various continuance. It may be continuous or pulsating but should have a sufficient duration to form a flow pattern in the milk layer at the tank bottom.

FIG. 5 shows a cut out section V—V of FIG. 4 at a larger scale, which discloses the elements of the mixing device 104. Advantageously, the agitation pipe 102 may be exemplified by the following design. A right-angled introductory end 116 has an outer diameter of 12 mm and emerges gradually into the injector jet 106, which has an inner diameter of 4.5 mm. The injector jet 106 is coaxially arranged in one end of the mixing device 104, which preferably is housed in an intermediate section 118 of the agitation pipe having an outer diameter of 25 mm, and its central axis is parallel to the central axis of said intermediate section 118. The opening 108, in the bottom side of the envelope surface of the mixing device 104 is advantageously given an inner diameter of 25 mm. Its central axis is preferably right-angled to the central axis of the injector jet 106, which with approximately 30° sloping outsides is protruding into the mixing device 104, to end in flush with the edge of the opening 108.

The spacing block 114 is suitably welded or otherwise fixed to the outside of the bottom side envelope surface of the mixing device 104 adjacent the opposite edge of the opening 108. By these measures a mixing device 104 of the conventional injector type may be achieved, which may be modified and developed in various ways as required.

FIGS. 6–8 show flow patterns for different applications of the agitation pipe 2 in imagined situations. FIG. 6 shows the flow pattern of an application with one agitation pipe 2 when the first milk spots have entered an empty cooling tank. FIG. 7 shows the same application but after a few animals have been milked and a pool 40 of milk is existing on the bottom of the tank. FIG. 8 shows an application according to FIG. 7, but having two oppositely arranged, counter-acting agitation pipes 2 and 2'.

To achieve a reliable cooling performance it is essential that the incoming milk be introduced onto the milk contacting surface 14 at the desired position (dp), which means at or close to the periphery 120 of the milk pool as disclosed in FIGS. 7 and 8.

In addition to the above described controlled cooling of milk entering the cooling tank 4, a circulation of milk which is assembled on the bottom of the cooling tank is also imaginable. As will be described in the following, this can be performed, either by means of the regular milk pump 22 of the input means 20 or by means of an additional pump means, advantageously a circulation pump 122. Said circulation of milk may be performed isolated from or in combination with the time intervals when the incoming milk, which is coming from the end unit 24, is entering the tank 4.

In this respect it is important to ascertain that the milk circulation is performed at a low rate, involving a minimum of shearing strain, in order to avoid the formation of free fatty acids. Therefore it is advisable that circulation pumping be performed in a very cautious way. Advantageously, said circulation pump 122 might be of the centrifugal type, which means that the "pressure head" or the pressure difference will be correspondingly low at a low flow rate in the circulation pump 122.

Advantageous arrangements for the circulation pumping appear from the embodiments described in the following with reference to FIGS. 9A–12B.

FIG. 9A shows an embodiment in which the circulation pump 122 is of the submersible type and located inside the tank 4. The circulation pump is arranged to draw milk from the pool 40 at the lowest part of the bottom wall portion 12. The milk is then returned or flushed into the tank 4 at a suitable point for agitation, for instance by means of the previously described agitation pipe 2 of the input means 20 or a similar device. The circulation pump might be conventionally driven by means of electricity, compressed air or vacuum.

FIG. 9B shows a variant of the embodiment in FIG. 9A, which is driven by means of a long drive shaft 124 and an electric driving motor 126 mounted on the top of the tank 4.

As has been previously described with reference to FIGS. 4 and 5, a mixing device 104 of the injector type may replace the agitation pipe 2. Also, said mixing device might serve as a pump 104 of injector type, which may be driven by means of the pressure from the milk pump 22. Fresh incoming milk is given a relatively high flow rate when fed through the injector jet 106 of the injector device 104, which relatively high flow rate is used to drive a major flow of milk drawn up from the bottom of the tank. Said incoming milk is warm, which in principal means the fat is in its molten state, the milk therefore being less sensitive and, at least for a short period of time, can take more shearing forces.

FIG. 10 shows a further embodiment having an external circulation pump 122', the low side or inlet of which being associated with the outlet 26 of the tank 4. To facilitate operation at a low outlet pressure, the return line 127 from the pressure face or outlet of said pump is connected to a line extended through the tank outlet 26 on its way to an outlet for agitation, which advantageously might be performed by means of the agitation pipe 2 as previously described. Advantageously, first 128, second 130 and third 132 valve means might be arranged in order to allow an optimised control of the milk flow. The first valve means 128 may be used for switching between emptying and re-circulation of the tank 4. The second 130 and third 132 valve means may be used for cutting off or connecting the agitation pipe 2 to a milk transport line 134 and for taking samples etc. respectively.

FIG. 11 shows an additional embodiment having an external circulation pump 122', the low side or inlet of which is associated with the outlet 26 of the tank 4 and a return line 227 of which passing over the top side of the tank 4. A chamber 136 is situated in the uppermost part of said return line 227, which at least in a first branch 227' is vertically extended. Said chamber is conventionally provided with a liquid-level controlled vacuum-connection 138 and by that capable to continuously maintain a siphon effect between said first branch 227' and a vertically extended second branch 227" of said return line 227. Said second branch 227" is connected to the agitation pipe 2 via a first check valve 140, which is arranged to seal said second branch to allow that milk may be drawn up when the milk circulation is to be started. This arrangement allows the circulation pump 122' to operate at a low outlet pressure (pressure face) which in turn means low flow rates. This is a prerequisite for making it possible to perform a circulation pumping of milk in cooling during a substantial period of time.

FIG. 12A is a variant of the embodiment in FIG. 11 and shows an arrangement with a pump means in the form of a chamber 136' only, in which variant the external circulation pump is omitted. Milk is drawn up from the outlet 26 to said chamber 136' by the influence of vacuum and then, via the first check valve 140 and the agitation pipe 2, released into the tank 4 and generating a stirring effect. The flow direction is conventionally controlled by means of said first check valve 140 and an second check valve 142, which check valves are arranged for interacting operation. By means of a three way valve 144 at the vacuum-connection 138 of said chamber and said counteracting check valves it is possible to alternately draw up milk and release it into the tank 4.

FIG. 12B is a further development in which it is shown that the chamber 136' need not be located above the top of the tank 4. By means of the influence of the above described siphon effect in the second branch 227" of the return line 227, it is possible to locate a chamber 136" at a lower level, as appears from the figure. However, this location of said chamber requires a separate drainage system, for instance comprising an overspill valve 146, for achieving a proper drainage of the chamber 136".

FIG. 13 shows a similar arrangement where the first 227' and second 227" branches of said return line 227 are replaced by one single, combined suction- and return pipe 227''', which is extended inside the tank 4 and connected to a pipe arranged between the tank outlet 26 and agitation pipe 2. On each side of this connection, third and fourth interacting check valves 140' and 142' respectively are so arranged, that the milk is allowed to flow in the direction from the fourth to the third check valve only. In case the circulation line comprises said chamber 136 under negative pressure, as described with reference to FIGS. 11–13, it is advantageous to use this chamber for emptying (draw empty) the milk transport line 134 before washing up is performed. A suitable valve arrangement is indicated with reference numeral 148 on the drawing.

FIG. 14A shows a further embodiment in which the vacuum chamber 136''' is functionally the same as described with reference to FIGS. 11–13. Milk from an AMS is fed to said chamber by means of the milk transport line 134 and a fourth valve means 150, which is closed during the emptying and washing up of the cooling tank 4. As a result the milk is forced to flow to an accumulation chamber 152, via a fifth valve means 154, which is set open. Provided said accumulation chamber is located at a higher level than the vacuum chamber 136''', it would be achieved that accumulated milk, via said fourth and fifth valve means 150, 154 and the vacuum chamber 136''' be discharged into the cooling tank 4.

By means of a cleaning valve 156 it is possible to arrange that washing-up detergent and/or rinsing water be flushed in for washing up the milk transport line 134 and simultaneously the accumulation chamber 152. For the washing-up it might be suitable to introduce a spray device 158 in the accumulation chamber 152. This might be used for spraying the inside of said chamber with washing-up detergent and/or rinsing water, which be guided for flowing back to the "CIP"-equipment through the fifth valve means 154 and cleaning valve 156.

FIG. 14B shows a development of the embodiment in FIG. 14A, in which development three milking units (AMS, VMS®) are connected to the cooling system by means of first 134', second 134" and third 134'" milk transport lines. Each milking unit and its milk transport line might be washed up individually even during the period of time when the cooling tank 4 be emptied and cleaned and the extracted milk be guided to the accumulation chamber 152 by means of correspondingly arranged fifth valve means 154', 154" and 154'" respectively.

Operation

FIG. 6 shows the tank 4 after it has been emptied and cleaned. As the milk will be introduced into the tank in milk spots, during a period of several hours, said milk spots might form a thin layer only on the bottom of the tank. By means of the control unit 25 the agitation pipe 2 of the input means 20 is arranged for inducing an intermittent milk flow of said small milk quantities across said milk contacting surface 14. The cooling equipment 15 is activated by means of the control unit 25 upon occurrence of a milk flow only, which by its own motion has a sufficient flow rate to prevent freezing of said small milk quantities for a corresponding magnitude of cooling power. By means of the agitation pipe 2 and its nozzle end 32, the incoming milk is introduced onto the milk contacting surface 14 at the determined position (dp), which is situated (1) between said first end wall 6 and a central part of the tank 4 and laterally displaced (b) relative to the perpendicular central axis of the tank. Thanks to said nozzle end 32 being directed towards said second end wall 8 of the tank 4, the milk spots or thin milk layer will be put in motion across the cooling surface 12 in the tank approximately as disclosed by the arrows in FIG. 6. This means that the magnitude of cooling power might be somewhat increased.

FIG. 7 shows the tank 4 after a sufficient amount of small milk quantities have been introduced to form a pool 40 of milk on the bottom wall portion 12 of the tank. Agitation of said milk pool 40 is performed by means of the hydraulic input of the incoming milk, which is let out through the nozzle end 32 of the agitation pipe 2 at the periphery 120 of the milk pool 40. As the milk is introduced at the periphery 120, the milk pool 40 will be put in a preferable elliptically rotating motion approximately as disclosed by the arrows in FIG. 7. The flow rate will be the highest at the periphery 120 and for tanks with cylindrical, elliptical or similarly formed bottom wall portions 12, the milk layer will be the thinnest at the periphery. The high flow rate will result in a reduced risk for freezing of the normally freezing-sensitive thin layer at the periphery 120, which means the magnitude of cooling power might be increased to a considerable extent.

FIG. 8 shows the tank 4 in the same status as in FIG. 7, but being provided with an extra agitation pipe 2'. By means of these two, oppositely arranged, counter acting agitation pipes 2, 2', the flow rate at the periphery 120 might be further increased and consequently also the magnitude of cooling power.

The embodiments and arrangements described with reference to FIGS. 10–13 are each provided with a pump means located outside the tank 4 and connected with the milk transport line 134, for the milk transport from the AMS. Said milk transport line 134 might be associated with an additional line, which at least periodically is flushed through by cooled milk. In case the milk transport line is ended in the third valve means 132, which allows separate washing up of the AMS and the milk transport line 134, said third valve means 132 might be advantageous from the hygienic aspect. The second valve means 130 for cutting off the milk transport line 134 from the milk cooling and circulating arrangement, on a first side might be in contact with cooled milk and be washed up on the other. Leakage of washing-up detergent into the milk side can be prevented by means of a pressure difference such as described in our patent application with the same inventor; SE 9903288-0.

During the washing up of the cooling tank 4 it is ascertained that the circulation line, comprising the return lines 127, 227 and the agitation pipe 2, 102, be flushed through with a washing-up detergent, thereby achieving that the valve means 130 be washed up on its first side. During this washing up it is appropriate to increase the pump-speed rate or the pulsation intensity in the circulation line.

In case the circulation line comprises said chamber 136 under negative pressure, as described with reference to FIGS. 11–13, it is advantageous to use this chamber for emptying (draw empty) the milk transport line 134 before washing up is performed. A suitable valve arrangement is indicated with reference numeral 148 on the drawing.

In the embodiments (see e.g. FIG. 11 and FIG. 14) which make use of a circulation pump of the centrifugal type, advantageously its driving motor would operate at a low speed during the cooling of milk but at a high speed during the washing up of the cooling tank and its transport line system.

In the embodiments (see e.g. FIG. 12 and FIG. 13) which make use of a vacuum chamber for intermittently or pulsating operation of the hydraulic agitation, preferably the pulse frequency might be lower during the cooling than during the washing up. When the milk level in the cooling tank has risen to such an extent, that a conventional mechanical agitator may be used with no risk for damages to the milk fat, said pulse frequency can be lowered further. In this state the drawing up and reentering of milk in the cooling tank is carried out for keeping cool the circulation lines, connections of transport lines and the pulsation/vacuum-chamber.

The differences in density between milk warm from the cow and cooled milk are relatively small. Therefore, a very cautious agitation with for example an external pump might possibly enable a slightly raised temperature level at the bottom layer close to the cooling surface of the tank. Also, this might cause some raise in the coefficient of utilisation of the cooling equipment.

As soon as the milk content in the tank 4 is sufficient for the regular agitator means 27 to work properly, it might be activated by means of the control unit 25, which simultaneously will set the cooling equipment 15 to run at full power. The milk temperature in the tank 4 is then monitored by means of the present temperature transducer 18.

What is claimed is:

1. A method for controlling the cooling of small milk quantities (milk spots) entering, with time intervals, a cooling tank (4) having a first end wall (6), a second end wall (8) and at least a bottom wall portion (12) with a milk contacting cooling surface (14) within the tank being part of a cooling circuit of a cooling equipment (15), characterised by the following steps:
   a) providing an input means (20) which is arranged for inducing an intermittent milk flow of said small milk quantities across said milk cooling surface (14),
   b) reactivating the cooling equipment (15) upon occurrence of a milk flow, which by its own motion has a sufficient flow rate to prevent freezing of said small milk quantities for a corresponding magnitude of cooling power, and
   c) using said input means (20) for, after a sufficient amount of small milk quantities have been introduced to form a pool (40) of milk on the bottom of the tank, agitation of said pool of milk by means of the hydraulic input of the incoming milk.

2. A method according to claim 1, characterised by arranging to the present magnitude of cooling power correspondingly controlled pumping sequences for the emptying of an end unit (24) of a milking system into the cooling tank (4), after milking of each animal, and transporting milk from the under-pressure part or re-circulating milk from the cooling tank (4).

3. A method according to claim 1, characterized by said incoming milk being drawn from said pool of milk by pumping means.

4. A method according to claim 1, characterized by arranging said input means (20) for inducing a rotatory movement of said pool (40) of milk.

5. A method according to claim 1, characterised by arranging said input means (20) with at least one agitation pipe (2,2') for introducing said hydraulic input of the incoming milk laterally displaced (b) in the tank.

6. A method according to claim 1, characterized by inserting an agitation pipe (2) to be extended through a regular milk outlet (26) of the tank.

7. A method according to claim 5, characterized by directing a nozzle end (32) of said agitation pipe (2) towards said second end wall (8) of the tank, for introducing the incoming milk in said direction and essentially parallel to the bottom wall portion (12) of the tank.

8. A method according to claim 1, characterized by arranging a temperature transducer (18) within the tank for monitoring the milk temperature in the tank and controlling (25) said cooling equipment (15) such, that the cooling power is reduced to a minimum when the milk temperature is decreasing and approaching a value in an interval between +6 and +10° C.

9. A method according to claim 8, characterised by deactivating the cooling equipment (15) when the milk temperature is approaching a value in an interval between +3 and +4° C.

10. A method according to claim 8, characterised by reactivating the cooling equipment (15) when the milk temperature is increasing and approaching a value in an interval between +6 and +10° C.

11. A method according to claim 1, characterized by arranging a means (16) for measuring and monitoring the milk quantity in the tank and deactivating (15) said cooling equipment when the milk quantity is insufficient for a regular agitator means (27) to work properly.

12. A method according to claim 5, characterized by,
   directing a nozzle end (32) of the agitation pipe (2) towards the milk contacting surface (14) at a position (dp) situated (1) between the first end wall (6) and a central part of the tank (4),
   the position (dp) being laterally displaced (b) relative to the perpendicular central axis of the tank, and
   directing the nozzle end (32) towards the second end wall (8) of the tank (4).

13. A system for controlling the cooling of small milk quantities (milk spots) entering, with time intervals, a cooling tank, comprising:
   a cooling tank (4) having a first end wall. (6), a second end wall (8) and a bottom with at least a bottom wall portion (12),
   said bottom wall portion with a milk contacting cooling surface (14),
   said milk cooling surface being part of a cooling equipment (15) cooling circuit; and
   an input means (20) arranged for i) inducing an intermittent milk flow of small milk quantities across said milk cooling surface (14), and ii) after a sufficient amount of the small milk quantities have been introduced to form a pool (40) of milk on the bottom of the tank, agitation of the pool of milk by an hydraulic input of the incoming milk.

14. A system according to claim 13, wherein,
   said input means (20) is provided, with an agitation pipe having a nozzle end (32) for introducing the incoming milk onto the milk contacting surface (14) at a position (dp), situated (1) between said first end wall (6) and a central part of the tank (4),
   said position (dp) being laterally displaced (b) relative to the perpendicular central axis of the tank, and
   said nozzle end (32) of said input means (20) is directed towards said second end wall (8) of the tank (4).

15. A system according to claim 14, characterised in that said input means (20) comprises a first agitation pipe (2) having a first end (28) and a second end (32), which agitation pipe at said first end (28) is attached to and extended through a regular milk outlet (26) in said first end wall (6) and said second end (32) being formed with said nozzle end (32).

16. A system according to claim 14, characterised in that the position (dp) is further determined by means of the nozzle end (32) being located at a predetermined height (h) over the lowest part of said bottom wall portion (12).

17. A system according to claim 14, characterised in that a spacer means (38) is arranged to separate the nozzle end (32) from said bottom wall portion (12).

18. A system according to claim 15, characterised in that said input means (20) comprises a second agitation pipe (2'), which is correspondingly arranged in the second end wall (8) opposite to said first agitation pipe (2) in the first end wall (6) of the tank (4).

19. A system according to claim 14, characterised in that said input means (20) comprises a pump means, which is embodied of the milk pump (22) of the end unit (24) in a milking system.

20. A system according to claim 19, characterised in that said input means (20) comprises an additional pump means (122).

21. A system according to claim 20, characterised in that said additional pump means is comprised of a circulation pump (122) of the centrifugal type.

22. A system according to claim 21, characterised in that said circulation pump (122) is of the submersible type and located inside the tank (4).

23. A system according to claim 21, characterised in that the circulation pump (122) is arranged to draw milk from the pool (4) at the lowest part of the bottom wall portion (12).

24. A system according to claim 21, characterized in that the circulation pump (122) is driven by means of a long drive shaft (124) and a driving motor (126) mounted on top of the tank (4).

25. A system according to claim 20, characterised in that the additional pump means comprises a pump (104) of the injector type driven by means of the pressure from the milk pump (22).

26. A system according to claim 20, characterised in that the additional pump means comprises an external circulation pump (122'), the inlet of which being associated with the outlet (26) of the tank (4).

27. A system according to claim 26, characterised in that said external circulation pump (122') is provided with a return line (227), which is passing over the top side of the tank (4) and the uppermost part of which being provided with a vacuum-connected (138) chamber (136), for returning milk from said outlet (26) to the tank (4).

28. A system according to claim 27, characterised in that said return line (227), downstream of said chamber (136), is connected to the agitation pipe (2) via a first check valve (140).

29. A system according to claim 28, characterised in that said external circulation pump (122') is omitted, said first check valve (140) being arranged for interacting operation with a second check valve (142) by means of a three way valve (144) at said vacuum-connection (138) to said chamber (136').

30. A system according to claim 29, characterised in that said chamber (136") is located at a level, which is lower than the top of the tank (4).

31. A system according to claim 27, characterised in that said return line (227), downstream of said chamber (136'), is connected to the agitation pipe (2) via a third check valve (140') and is associated with said outlet (26) of the tank by means of a fourth check valve (142'), said check valves being arranged to interact such, that a flow would be allowed in the direction from the fourth to the third check valve only.

32. A system according to claim 27, characterized in that a milk transport line (134), by means of fourth (150) and fifth (154) valve means, is connectable to either said vacuum chamber (136''') or an accumulation chamber (152), which is located at a higher level than said vacuum chamber.

33. A system according to claim 32, characterised in that first (134'), second (134") and third (134''') milk transport lines are connectable to said accumulation chamber (152) by means of correspondingly arranged fifth valve means (154', 154" and 154''').

* * * * *